Oct. 9, 1951        T. C. MARTIN        2,570,357
PERISCOPE FOR MOTOR VEHICLES
Filed March 8, 1950
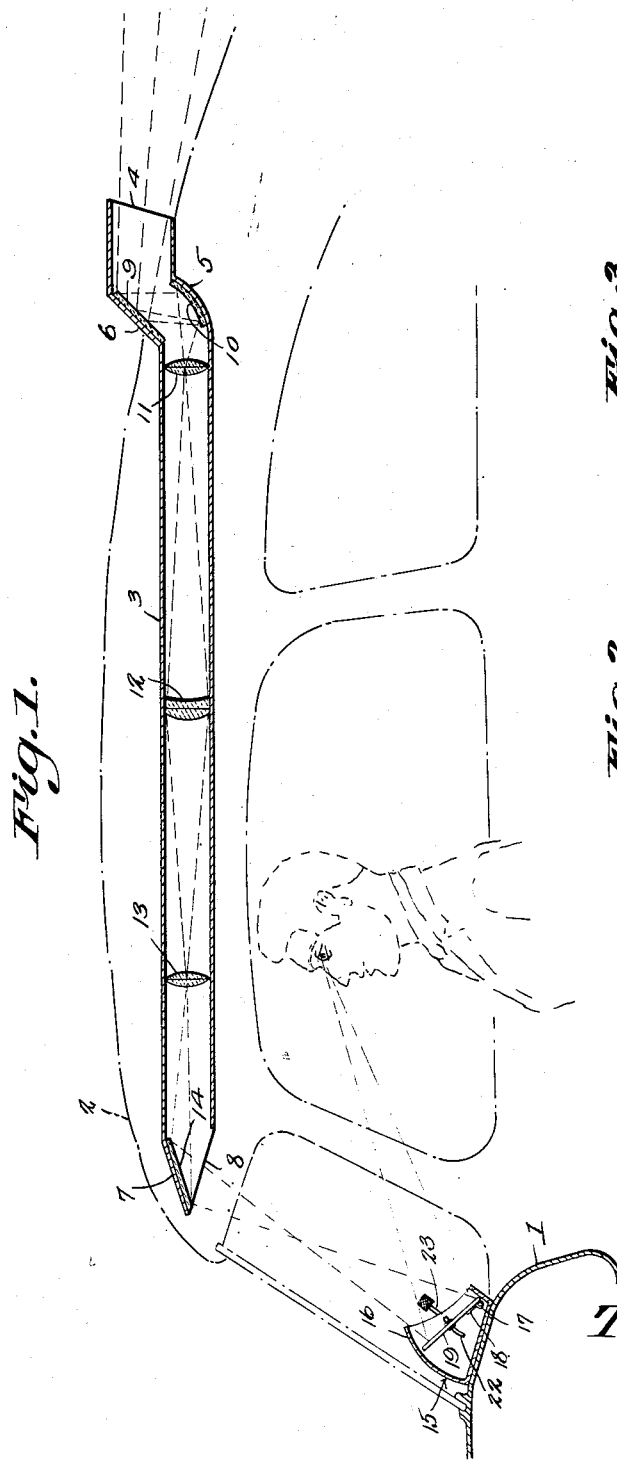
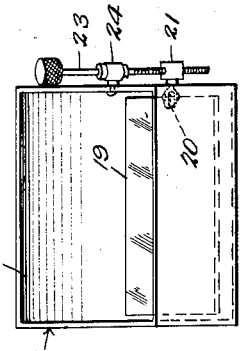
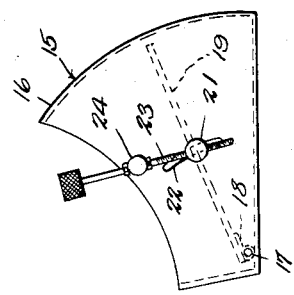
T. C. Martin
INVENTOR
BY *CA Snowles*
ATTORNEYS.

UNITED STATES PATENT OFFICE 2,570,357

PERISCOPE FOR MOTOR VEHICLES

Tolly C. Martin, Monterey, Calif.

Application March 8, 1950, Serial No. 148,393

1 Claim. (Cl. 88—70)

This invention relates to a periscope for motor vehicles and has for its main object the provision of an improved device of this type that will be more efficient than previous similar devices, relatively lower in cost, and arranged to be viewed with minimum shifting of the eyes from the road ahead.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1 is a longitudinal section through a periscope formed in accordance with the invention.

Fig. 2 is an enlarged side elevational view of the viewer housing.

Fig. 3 is a front elevational view of the viewer housing.

Referring to the drawings in detail, in the illustrated example the periscope is mounted in a conventional automobile having the instrument panel 1 and roof 2. Secured to the under side of the roof is the elongated tube 3 extending from front to rear of the vehicle and preferably of rectangular cross section. Tube 3 has an offset rear end 4 opening through the roof 2. The bottom wall 5 of the offset is of concave configuration as seen from Fig. 1, while the upper wall 6 is flat, both of said walls being inclined approximately forty-five degrees, more or less.

The front end of the tube 3 is provided with the overhang 7 inclined downwardly to a slight degree, this defining a slightly inclined front opening 8 for the tube.

Mounted against the flat wall 6 of the rear offset is the flat reflecting mirror 9 reflecting the image to the concave mirror 10 which in turn projects the image through a series of lenses 11, 12 and 13 respectively, spaced longitudinally of the tube 3 and causing the image to be projected against mirror 14 secured to the overhang 7. The image is then reflected downwardly into the viewer housing, generally designated 15 and mounted upon the instrument panel 1 immediately above the steering wheel, not shown, so that the operator of the vehicle can be cognizant at all times of images seen in the housing, without taking his eyes from the road ahead.

The housing 15 is formed with a high outer wall 16 that constitutes a shield against undesired reflections of the sun, or excessive light or stray images, any of which would adversely affect the efficiency of the device. The inner wall of the housing, however, is low so as to permit the operator of the vehicle to look directly into the housing without difficulty.

Extended transversely between the side walls of the housing 15 is a pivot pin 17 on which is pivotally mounted the sleeve 18 to which is rigidly secured the inner end of a reflecting mirror 19 which is thus mounted for swinging movement to selected positions of adjustment found particularly suitable to the particular operator of the vehicle.

Means for adjusting the mirror to selected positions and holding the mirror in the selected adjustment is provided, and to this end, a clamp 20 is secured to the mirror and is provided with a pivotally mounted sleeve 21 having a threaded bore.

The clamp 20 and sleeve 21 are connected by an arm that extends through the arcuate slot 22 formed in one side wall of the viewer housing.

An adjusting screw 23 is threaded in the bore of the sleeve 21, and is rotatably mounted in a sleeve 24 pivotally mounted on the side wall of the housing.

The path of rays extending into the rear end of the tube 3 is clearly shown in the dotted lines in the drawing, these striking the mirror 9 and being reflected to the mirror 10 and then through out the tube and finally to the adjustably positioned mirror 19. In this way, the operator of the vehicle is enabled to see all that is behind him, without taking his eyes from the road ahead.

What is claimed is:

A periscope for motor vehicles comprising an elongated tube adapted to be mounted against the under side of a vehicle roof, said tube having an offset rear end opening through the roof of said vehicle, the front end of said tube being cut away obliquely and having an overhang slightly inclined downwardly toward the front end of the vehicle, said overhang defining a slightly inclined front opening for the tube; a series of mirrors and lenses mounted in said tube positioned to receive an image through the offset rear end of the tube and cast said image downwardly through the front end of said tube to a location on the instrument panel of said vehicle; a viewer housing mounted on said instrument panel and having an elevated outer wall and a low inner wall, said outer wall being curved backwardly from the front end of the vehicle; and a mirror pivotally mounted within the viewer housing for adjustment to selected positions relative to the front end of said tube and the eyes of the viewer, said mirror being hinged to the housing adjacent the inner wall of the housing, the hinge connection of the mirror being at one end of the mirror and the other end of the mirror being swingable in an arc corresponding to the curvature of said outer wall, said mirror being adjustably connected to said housing by means including a sleeve clamped to the mirror intermediate opposite ends of the mirror, a stud pivotally mounted upon the housing and threadably engaged in said sleeve, and means on said stud accessible to a vehicle operator for rotating the stud, whereby to impart swingable movement to said mirror on its hinge connection.

TOLLY C. MARTIN.

REFERENCES CITED

The following references are of record in the file of this patent:

UNITED STATES PATENTS

| Number | Name | Date |
| --- | --- | --- |
| 1,644,902 | Voigt | Oct. 11, 1927 |
| 1,649,083 | Ruth | Nov. 15, 1927 |

FOREIGN PATENTS

| Number | Country | Date |
| --- | --- | --- |
| 228,594 | Great Britain | Feb. 12, 1925 |